C. D. WOODWARD.
APPARATUS FOR NAVIGATION AND THE LIKE.
APPLICATION FILED JAN. 18, 1916.
1,188,522.
Patented June 27, 1916.
2 SHEETS—SHEET 1.
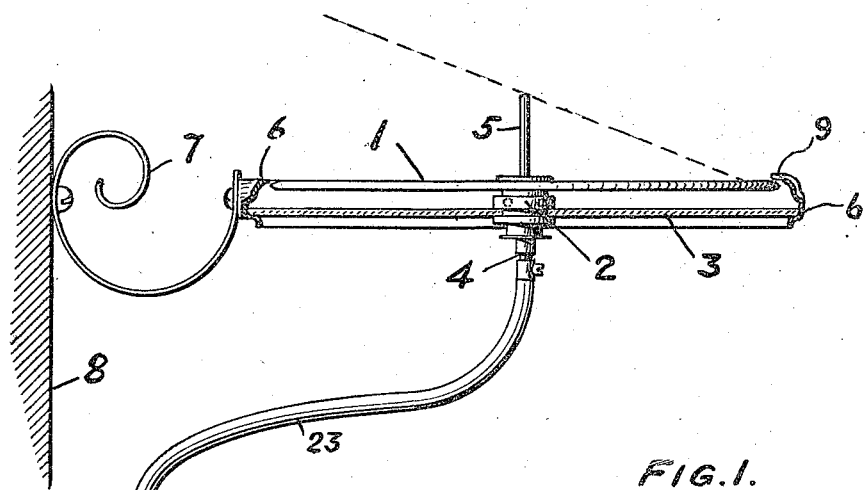
FIG.1.
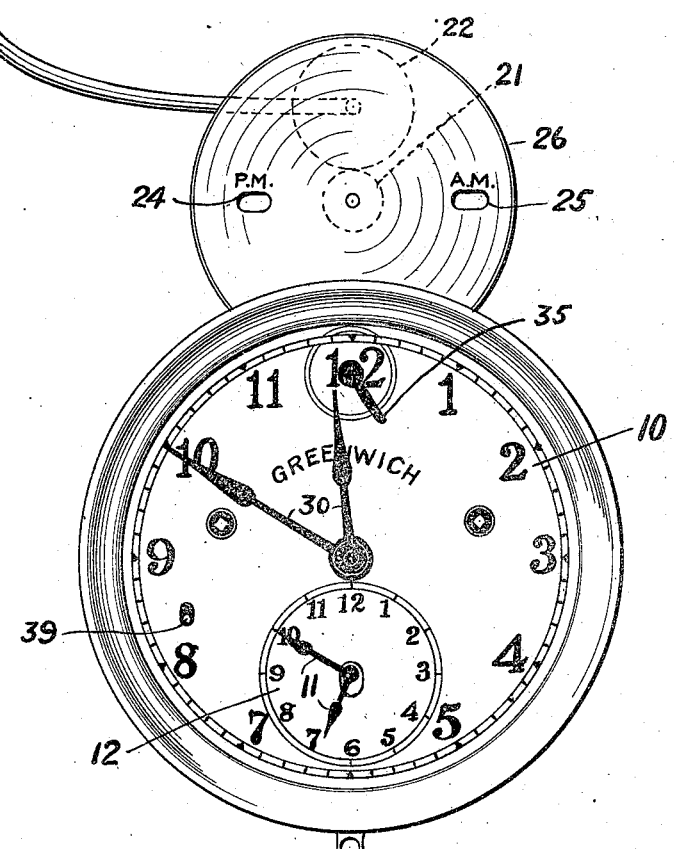
WITNESS:
Robt R Kitchel
INVENTOR
Charles D. Woodward
BY
Augustus B Stoughton
ATTORNEY.

C. D. WOODWARD.
APPARATUS FOR NAVIGATION AND THE LIKE.
APPLICATION FILED JAN. 18, 1916.
1,188,522.
Patented June 27, 1916.
2 SHEETS—SHEET 2.
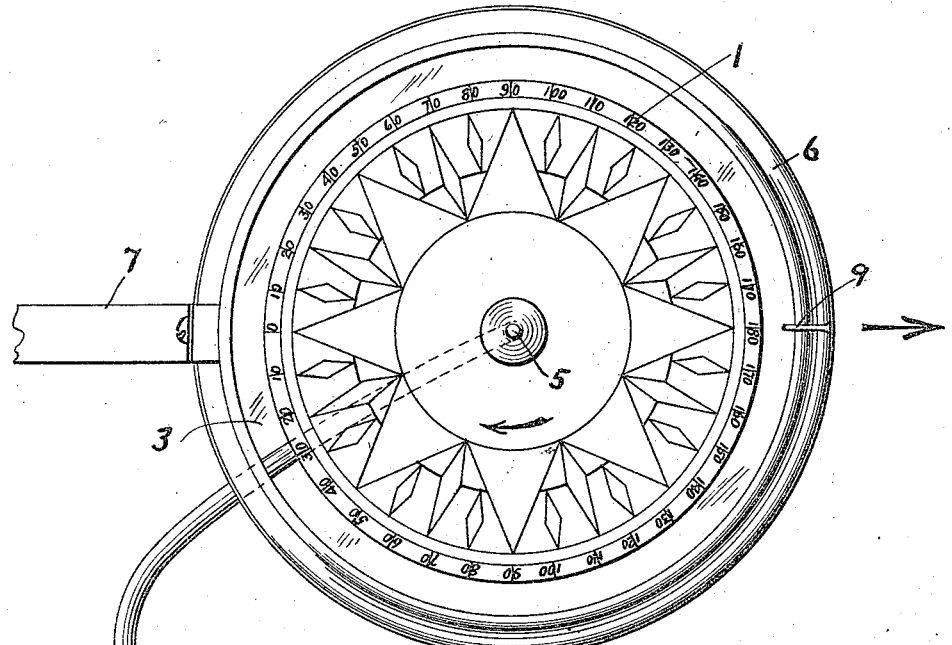
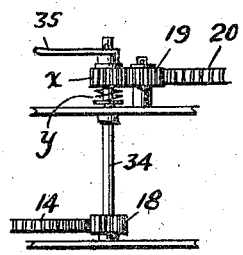
FIG. 2.
FIG. 3.
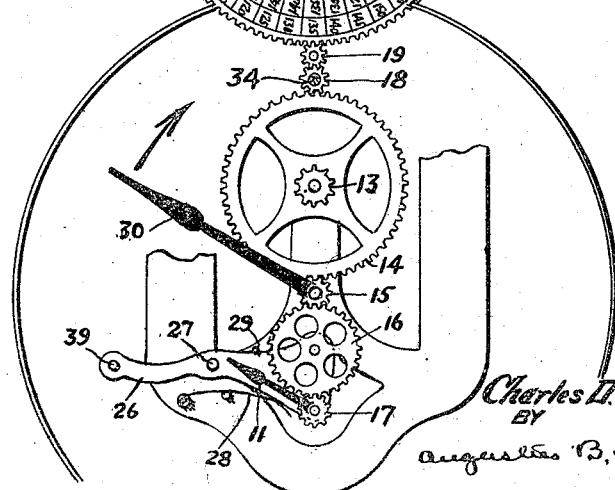
WITNESS:
Rob't R. Kitchel
INVENTOR
Charles D. Woodward
BY
Augustus B. Stoughton
ATTORNEY.

UNITED STATES PATENT OFFICE.

CHARLES D. WOODWARD, OF PROVIDENCE, RHODE ISLAND.

APPARATUS FOR NAVIGATION AND THE LIKE.

1,188,522.  Specification of Letters Patent.  Patented June 27, 1916.

Application filed January 18, 1916. Serial No. 72,668.

*To all whom it may concern:*

Be it known that I, CHARLES D. WOODWARD, a citizen of the United States, and a resident of Providence, in the county of Providence and State of Rhode Island, have invented a certain new and useful Apparatus for Navigation and the like, of which the following is a specification.

The principal object of the present invention is to provide simple, reliable, convenient and easily manipulated apparatus which indicates the sun's true bearings and which consequently can be used by navigators of aeroplanes, submarines, ships and the like, as a means for ascertaining direction and geographical positions.

In the embodiment of my invention, which I shall describe, use is made of two sets of clock hands and faces, whereof one keeps Greenwich mean time and the other is adapted to be set to the local apparent time of the place of observation which, if unknown, can be determined as from its latitude and longitude upon reference to tables or charts provided for that purpose. In connection with such clock mechanism use is made of a style and of a graduated shadow-disk marked in the sun's degrees and also with points of the compass and connected with the clock mechanism for rotation in correspondence or agreement with the relative angular motion of the earth and sun and adapted to be set with reference to the sun's degrees represented by the time difference. In connection with the above mechanism use may be made of an index wheel that is of service in setting the shadow-disk.

The foregoing statement is not intended to define the invention but is explanatory of the invention, which will be claimed at the end hereof but first described in connection with the embodiment of it chosen from among other embodiments for illustration in the accompanying drawings, in which—

Figure 1, is an elevational view, partly in section, illustrating apparatus embodying features of the invention. Fig. 2, is a more or less diagrammatic view illustrating the shadow-disk in plan and other parts of the apparatus in sectional elevation, and Fig. 3, is an elevational view, partly in section, of a part of the apparatus hereinafter referred to.

In the drawings 1 is an observation shadow-disk marked with degrees from zero to one hundred and eighty and from one hundred and eighty to zero, and it is revolved from left to right or clock-wise once each twenty-four hours. This disk is divided into, for example, thirty-two different points giving eleven degrees and fifteen minutes to each point, marked N.W.—W.—S.W.—S.—S.E.—E.— and N.E. The disk 1 may be constructed of glass rendered somewhat obscure or frosted, as it is sometimes called, so that its markings can be read from either the top or the bottom. When the apparatus is used in navigation, and perhaps for other purposes, it is desirable to be able to read the disk from the bottom and this can be accomplished by making it of frosted glass. As shown the bearing 2 for the disk 1 is mounted on a plate 3 that can be made of clear glass and when this plate is made of clear glass the marking on the disk 1 can, of course, be seen through it. The spindle 4 of the disk 1 is shown as projecting from the bearing 2, which is illustrated as of the ball bearing variety.

5 is a style arranged at the center of the disk 1 and projecting upward at right angles to its plane. As shown the style constitutes a prolongation of the spindle 4 and so rotates, but that is a matter of convenience in construction as there is no necessity for the style to rotate. The plate 3 is carried by a ring 6, as of brass, which is shown as connected by a bracket 7 with a standard or other appropriate support 8 connected with the aeroplane, submarine, vessel or other object to be navigated.

9 is the lubbers line or mark and it in connection with the center of the disk 1 indicates the fore and aft direction.

The clock hands 30 of the face 10 and the clock hands 11 of the face 12 are driven from the same clock mechanism as is also the disk 1.

13, is the driven pinion of the clock mechanism, and the means, as springs and connections, for driving it and the escapement mechanism for controlling it are too well understood to require description or illustration. From this pinion 13 the hands 30 are driven by toothed wheels 14 and 15 and the hands 11 are driven from the toothed wheel 15 by toothed wheels 16 and 17. The disk 1 is driven from the toothed wheel 14. As shown this is accomplished by idlers 18 and 19 interposed between the toothed wheel 14 and a toothed wheel 20 to which is connected a toothed wheel 21 that meshes with a toothed wheel 22, which drives the disk 1, as by means of a shaft 23 which may be and is shown as of the flexible variety. The ratio of the various gear wheels is such that the clocks run as usual, the wheel 20 makes two clockwise revolutions each twenty four hours and the disk 1 makes one clockwise revolution each twenty four hours. The wheel 20 is provided with an index dial indicating degrees from 0 to 179 on an outer circle and 180 to 0 on an inner circle, and coöperates with windows 24 and 25, one for forenoon and one for the afternoon, provided in a suitable housing 26. It should be stated that the toothed wheel 18 meshes with the toothed wheel 14, and that a wheel $x$ frictionally mounted on the spindle 34 and spaced from and a duplicate of the wheel 18, actually meshes with the toothed wheel 20. The frictionally mounted wheel $x$ is connected as by a spring washer $y$ with a hand 35, which when turned, turns the index dial or wheel 20 and also the disk 1. An arm 36 pivoted at 27, carries the wheels 16 and 17, so that they can be turned out of mesh with the wheel 15 and thus permit the hands 11 to be set. A spring 28 and its coöperating stop 29 are shown for returning the arm. 39 is a finger piece accessible from the outside and by which the arm 26 can be moved to permit of the setting of the hands 11.

From the foregoing description those skilled in the art will understand the mode of operation of the apparatus and the uses to which it can be put, but the following statement may be of service. If we consider the object in connection with which the apparatus of the invention is used to be an aeroplane, the disk 1 will be arranged above the aviator so that he can conveniently read it from the bottom. If the aeroplane is at rest, for example, on the ground in a certain locality and is facing north, although that fact may not be known to the aviator, then at noon in that locality the shadow cast by the style on the disk 1 will lie due north and south, so that the shadow will indicate 180° on the disk and also the marking indicating north. The aviator by reference to the shadow reads the marking for north and ascertains that he is facing north. As time goes on the disk 1 is turned clockwise at the rate of one revolution in twenty-four hours and its degree corresponds with the sun's degree, so that if after some time has lapsed the shadow be again referred to it will still indicate the north marking on the disk 1, since that marking has traveled through the same number of degrees as indicates the relative travel of the sun and earth. It is evident that if the aeroplane instead of remaining still had turned around more or less, it would have turned the disk and the lubbers marking collectively but not in respect to each other, so that in these circumstances, reference to the shadow and the marking which it indicates on the disk 1 afford means for ascertaining the direction in which the aeroplane is pointed, and of course generally indicates the points of the compass. To set the disk 1 so that its angular position shall correspond in degrees with the sun's degrees the following procedure may be practised. The hands 30 and face 10 indicate Greenwich mean time and the hands 11 are set in respect to the face 12, using the finger piece 39, to indicate local apparent time. Local apparent time can be ascertained in respect to Greenwich time by knowing the geographical position of the place of observation and using tables prepared for the purpose. It will be assumed that local apparent time is three hours behind Greenwich time. Three hours corresponds with forty-five of the sun's degrees, since there are fifteen sun degrees for each hour. The time is in the forenoon and subtracting forty-five degrees from one hundred and eighty degrees leaves one hundred and thirty-five degrees. By means of the hand 35 the index dial is set to indicate 135° in the forenoon and in doing this the disk 1 is set angularly to the correct position to correspond with the sun's degree in the location where the observation is made. If the time had been in the afternoon the index dial 20 would be set in a similar manner but with reference to the window marked PM. After the apparatus has been thus set it will continue to run and an observation of the shadow in respect to the disk 1 affords means for determining direction as has been indicated and also means for determining the exact geographical position of the aeroplane because it gives the sun's true bearings.

It may be stated that the marking on the disk 1 appropriate for the northern hemisphere would be reversed in the southern hemisphere, so that two appropriately marked disks may be provided, one for use in the northern and one in the southern hemisphere. Again since the sun's true bearings are known the drift of an aeroplane can be calculated as will be well understood.

The invention is not limited in matters of detail of construction and arrangement nor to the uses described since those matters may be varied within the scope of the invention, which I do not intend to limit in any way other than the appended claims and the prior state of the art may require.

I claim:

1. Navigation apparatus comprising the combination of a clock mechanism provided with two sets of hands and faces whereof one keeps Greenwich mean time and the other is adapted to be set to local apparent time, means for disconnecting the hand mechanism last referred to from the clock mechanism to set the hands, an index dial graduated in degrees substantially as described and geared to said clock mechanism for clockwise rotation twice in twenty-four hours, a hand for setting said index dial independently of the clock mechanism, a rotatable disk geared to said index dial for clockwise rotation once in twenty-four hours in correspondence with the sun's degrees and marked in degrees and in compass points substantially as set forth, and a style of which the shadow coöperates with the disk, substantially as described.

2. Navigation apparatus comprising the combination of clock mechanism provided with two sets of hands and faces whereof one keeps Greenwich mean time and the other is adapted to be set to local apparent time, means for disconnecting the hand mechanism last referred to from the clock mechanism to set the hands, a rotatable disk geared to said clock mechanism for clockwise rotation once in twenty-four hours in correspondence with the sun's degrees and marked in degrees and in compass points substantially as set forth, a style of which the shadow coöperates with the disk, and means for setting said disk in respect to the clock mechanism and in correspondence with the sun's degree, substantially as described.

3. Navigation apparatus comprising the combination of a clock mechanism provided with two sets of hands and faces whereof one keeps Greenwich mean time and the other is adapted to be set to local apparent time, means for disconnecting the hand mechanism last referred to from the clock mechanism to set the hands, an index dial graduated in degrees substantially as described and geared to said clock mechanism for clockwise rotation twice in twenty-four hours, a hand for setting said index dial independently of the clock mechanism, a rotatable disk geared to said dial for clockwise rotation once in twenty-four hours in correspondence with the sun's degree and marked in degrees and in compass points substantially as set forth, and a style of which the shadow coöperates with the disk to indicate the sun's true bearings.

4. Navigation apparatus comprising the combination of a clock mechanism provided with two sets of hands and faces whereof one keeps Greenwich mean time and the other is adapted to be set to local apparent time, means for disconnecting the hand mechanism last referred to from the clock mechanism to set the hands, an index dial graduated in degrees substantially as described and geared to said clock mechanism for clockwise rotation twice in twenty-four hours, a hand for setting said index dial independently of the clock mechanism, a rotatable disk geared to said dial for clockwise rotation once in twenty-four hours in correspondence with the sun's degree and marked in degrees and in compass points substantially as set forth, a style of which the shadow coöperates with the disk to indicate the sun's true bearings, and means for setting the disk angularly in respect to the clock mechanism and in correspondence with the degrees of the sun's degrees.

5. Navigation apparatus comprising the combination of two sets of clock hands and faces whereof one keeps Greenwich mean time and the other is adapted to be set to local apparent time, a rotatable disk geared to said local apparent time mechanism for clockwise rotation once in twenty-four hours in correspondence with the sun's degree and marked in degrees and in compass points substantially as set forth, and a style of which the shadow coöperates with the disk to indicate the sun's true bearings.

6. Navigation apparatus comprising the combination of two sets of clock hands and faces whereof one keeps Greenwich mean time and the other is adapted to be set to local apparent time, a rotatable disk geared to said local apparent time mechanism for clockwise rotation once in twenty-four hours in correspondence with the sun's degree and marked in degrees and in compass points substantially as set forth, a style of which the shadow coöperates with the disk to indicate the sun's true bearings, and means for angularly setting said disk in correspondence with the sun's degrees and independently of said clock mechanism.

7. In navigation apparatus a translucent shadow disk marked substantially as described in combination with a style adapted to cast a shadow on said disk which is readable from beneath as well as from above said disk.

8. In navigation apparatus the combination of a translucent shadow disk, of a transparent plate, a bearing carried by said plate for said disk, and a style adapted to cast a shadow on said disk which is readable from beneath as well as from above said disk.

9. In navigation apparatus the combination of a ring having a lubbers mark, a plate carried by said ring, a bearing carried by said plate, and a disk revoluble in said bearing and marked substantially as described.

10. In navigation apparatus the combination with the clock mechanism of an index dial geared thereto for clockwise rotation twice in twenty-four hours and marked in degrees, substantially as described.

11. In navigation apparatus the combination with clock mechanism of an index dial geared thereto for clockwise rotation twice in twenty-four hours and marked in degrees, and a disk marked substantially as set forth and geared to said dial for clockwise rotation once in twenty-four hours.

CHARLES D. WOODWARD.

Copies of this patent may be obtained for five cents each, by addressing the "Commissioner of Patents, Washington, D. C."